United States Patent
Jones et al.

[11] 3,726,953
[45] Apr. 10, 1973

[54] METHOD OF FORMING SHEET MATERIAL

[75] Inventors: Robert M. Jones, Fullerton; Howard G. Nourse, Palos Verdes, both of Calif.

[73] Assignee: McDonnell Douglas Corporation, Santa Monica, Calif.

[22] Filed: June 3, 1970

[21] Appl. No.: 54,029

Related U.S. Application Data

[62] Division of Ser. No. 733,016, May 29, 1968, Pat. No. 3,570,067.

[52] U.S. Cl. ..................264/89, 264/92, 264/93, 264/292, 264/323
[51] Int. Cl. .............................................B29c 17/04
[58] Field of Search.....................264/89, 90, 92, 93, 264/292, 327, 323; 425/388

[56] References Cited

UNITED STATES PATENTS

| | | | |
|---|---|---|---|
| 2,522,956 | 9/1950 | Middleton | 264/327 X |
| 2,666,951 | 1/1954 | Grove et al. | 264/92 UX |
| 3,349,153 | 10/1967 | Beck | 264/292 X |
| 2,531,540 | 11/1950 | Smith | 264/92 |
| 2,270,185 | 1/1942 | Dulmage | 264/292 UX |
| 2,917,783 | 12/1959 | Olson et al. | 18/19 F UX |
| 2,688,156 | 9/1954 | Monaco | 264/92 |
| 3,060,507 | 10/1962 | Knowles | 264/89 |
| 3,172,927 | 3/1965 | Mojonnier | 264/92 |
| 3,207,821 | 9/1965 | Jones-Hinton et al. | 264/92 |
| 3,235,639 | 2/1966 | Knowles | 264/92 |

FOREIGN PATENTS OR APPLICATIONS

| | | | |
|---|---|---|---|
| 883,585 | 11/1961 | Great Britain | 264/92 |

OTHER PUBLICATIONS

Allison & Doyle, "Thermoforming Techniques for High–Density Polyolefin Sheet," Modern Plastics, June 1961, pp. 123–129, 198, 202 & 203.
"Vacuum Molding", British Plastics, July 1945, pp. 277, 278.

*Primary Examiner*—Robert R. White
*Assistant Examiner*—J. H. Silbaugh
*Attorney*—J. Edwin Coates, Walter J. Jason and Donald L. Royer

[57] ABSTRACT

Upright airtight chamber with open upper end houses vertically moving platen carrying form block. First draw ring mounted on rim of chamber with aperture corresponding to form block. Second draw ring with corresponding aperture above first ring and movable up and down to load and slidably grip heat-softened sheet of thermoplastic material between rings. Form block passes up through apertures to flow-form sheet. Pressure and vacuum means to blow-form sheet up or down into dome shape before form block is actuated. When forming is virtually complete, vacuum may be applied instantaneously to snap sheet back on form block for accurate shaping.

2 Claims, 7 Drawing Figures

INVENTORS
ROBERT M. JONES
HOWARD G. NOURSE

BY
— AGENT —

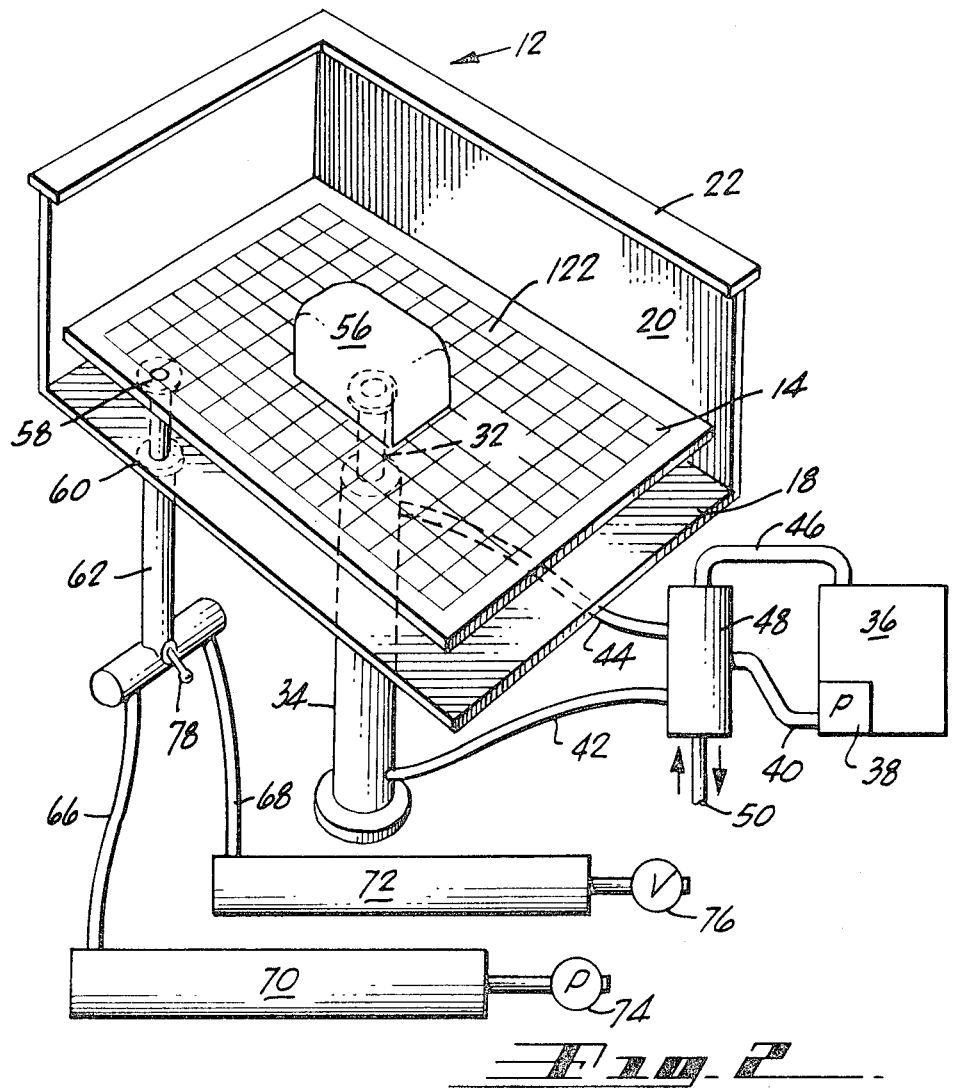
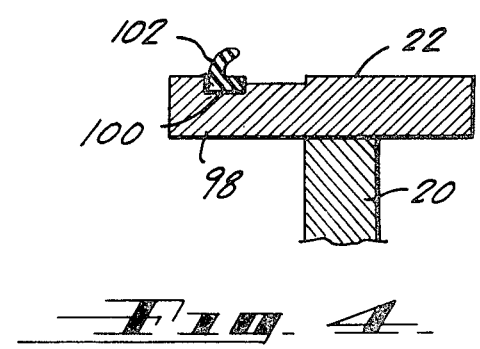

INVENTORS
ROBERT M. JONES
HOWARD G. NOURSE

BY  —AGENT—

METHOD OF FORMING SHEET MATERIAL

This is a division of application Ser. No. 733,016 filed May 29, 1968, now U.S. Pat. No. 3,570,067.

BACKGROUND OF THE INVENTION

The low pressure forming industry has been working for many years with thermoplastic sheet material, producing many varied shapes such as boxes, covers, and decorative articles. A great many materials are available for the purpose, such as vinyl and acetate compounds to name a few. The particular compounds for these uses are so formulated that they have adequate stiffness or rigidity at room or operating temperatures. While the materials differ greatly in appearance, strength, workability and cost they have the common characteristic that at some elevated temperature they soften and can be stretched and flowed to desired shape. They are cooled while held in their final form and will then retain this form unless they are again brought up to softening temperature.

One commonly practiced forming technique is to grip the margin of the softened sheet and push a plug or form block into the unsupported area, usually through an aperture in a plate, to cause the sheet to stretch and conform to the shape of the form block. Since the margin is gripped immovably, the sheet is not free to flow laterally in its own plane to any great extent. The result is that the sheet is often thinned excessively and will actually fail where it is forced into small radius curves. In addition, the flash, or waste portion of the sheet, is excessive with respect to the portion which goes into the finished article.

The vacuum technique is also rather widely used. In this technique a form block is mounted in the central portion of a plate or platen and a sheet of material is draped over the form block and gripped at the margin of the platen. A vacuum is then produced between the sheet and the platen and draws the sheet down against the platen and into contact with the side walls of the form block. Extreme care in setting up is necessary to prevent formation of wrinkles, and the area of the sheet must be very large compared to that of the form block to permit proper stretch and flow. Thus the waste is even greater than with the ring and plug technique described above.

SUMMARY OF THE INVENTION

The operating techniques of the present invention overcome the difficulties mentioned above and provide a complete system for forming a wide variety of articles having reasonably complex shapes.

Generally stated, the apparatus for carrying out the noted operating techniques comprises a support which preferably is in the form of a cabinet enclosing the power sources and equipment and an upright chamber carried by the support. The chamber may be cylindrical or other shape but is preferably in the shape of a box having a rectangular planform, with closed bottom and side walls and open at the upper end which is defined by a generally planar rim having flanges extending inwardly and outwardly of the chamber walls.

A first planar draw ring has approximately the same shape and size as the rim and is immovably secured thereto by suitable releasable clamp devices. The ring is a rigid plate with a generally central aperture therethrough which corresponds approximately to the planform of a part to be formed. A seal is provided between the ring and the rim for reasons outlined later herein. A second draw ring of the same planform is located above the first ring and releasably mounted in a frame which in turn is carried by two upright piston rods for movement toward and away from the first ring. The piston rods are mounted in upright cylinders motivated by compressed air to lower the second ring into proximity to the first ring to yieldably and slidably grip a free sheet of heat softened thermoplastic material between the rings.

A platen is located in the chamber and mounted on a hydraulic servo motor to move between the bottom of the chamber and a position substantially coplanar with the rim and carries means for locating and mounting a punch or form block in a generally central position in registry with the apertures in the rings. In operation, a suitable sheet of thermoplastic material is heated to softening temperature and laid on the first ring in a generally central position. The second ring is then lowered to slidably grip the sheet. The form block is then raised to pass through the apertures in the rings and push the sheet upwardly.

Since the sheet is slidably gripped, it is free to flow laterally in all directions in its own plane as it moves upwardly through the aperture in the second ring. As a result, it automatically molds itself to the shape of the form block and experiences a minimum of local stretching. Thus its final thickness is a greater percentage of its original thickness than in previous systems and it is much more uniform throughout its entire area. There are no weak spots to rupture under the forming stress. Moreover, the flash or surplus material still lying between the rings at the termination of the forming operation is very small, just enough for the gripping action to exert a slight drag to smooth out the formed section.

The saving which can be achieved is well illustrated by an example of the forming of a simple cup shaped part approximately 3½ inches in diameter and 3½ inches high. With the present system the blank sheet required was 49 square inches in area and 0.060 inch thick, and the resulting article was quite uniform in thickness with no weak spots. For the vacuum system described above, the blank required was 400 inches in area and 0.100 square inch thick, and the resulting article was much less uniform in thickness and had one or more weak spots.

Means are provided to produce a pressure or vacuum in the chamber to cause the material to bulge to a dome or bubble shape before the form block is raised. Since the gripping pressure is low enough to allow controlled slippage, the dome portion flows in all lateral directions in the plane of the material so that the dome thickness is very uniform. Consequently, when the form block is moved into the dome there is a minimum tendency to produce variations in the thickness of the finished article.

When the form block is raised to its maximum height the platen is substantially coplanar with the rim of the chamber and in sealing relation therewith. A sealing flap may be carried by the rim but is preferably mounted to the platen and makes sealing contact with the rim when the platen reaches its uppermost position.

There is now a very small volume between the platen and form block and the sheet. At this time a vacuum is applied to pull the sheet tightly into contact with the form block and produce maximum conformity. The small volume requires a minimum air withdrawal which results in economical operation. The volume to be evacuated is connected to a negative surge tank which can be put into instantaneous communication by sudden full opening of the control valve. Because of the small volume compared to the surge tank, the vacuum is instantaneous and snaps the formed sheet firmly into contact with the form block.

The draw rings are made of non-metallic material having a low heat conductivity to minimize cooling of the sheet before forming is completed. Means are provided above the second ring to direct cooling air onto the formed article extending above the second ring, and the low heat conductivity of the form block now minimizes heat flow into the article. It can therefore be removed in a very short time, with consequent increase in the production rate of the apparatus.

Another feature is the provision of a forming aid for use when a form block has a depression in its contour. A small air-actuated servo motor is mounted above the second ring and carries a body shaped to match the depression. When the servo motor is actuated the body is pushed into the depression to insure absolute conformity of the article to the form block.

BRIEF DESCRIPTION OF THE DRAWINGS

Various other advantages and features of novelty will become apparent as the description proceeds in conjunction with the accompanying drawings, in which:

FIG. 3 is a schematic side elevational view, partly in section, of the principal elements of the apparatus;

FIG. 4 is a sectional detail of the chamber rim seal;

DESCRIPTION OF THE PREFERRED EMBODIMENTS

Figure 1:
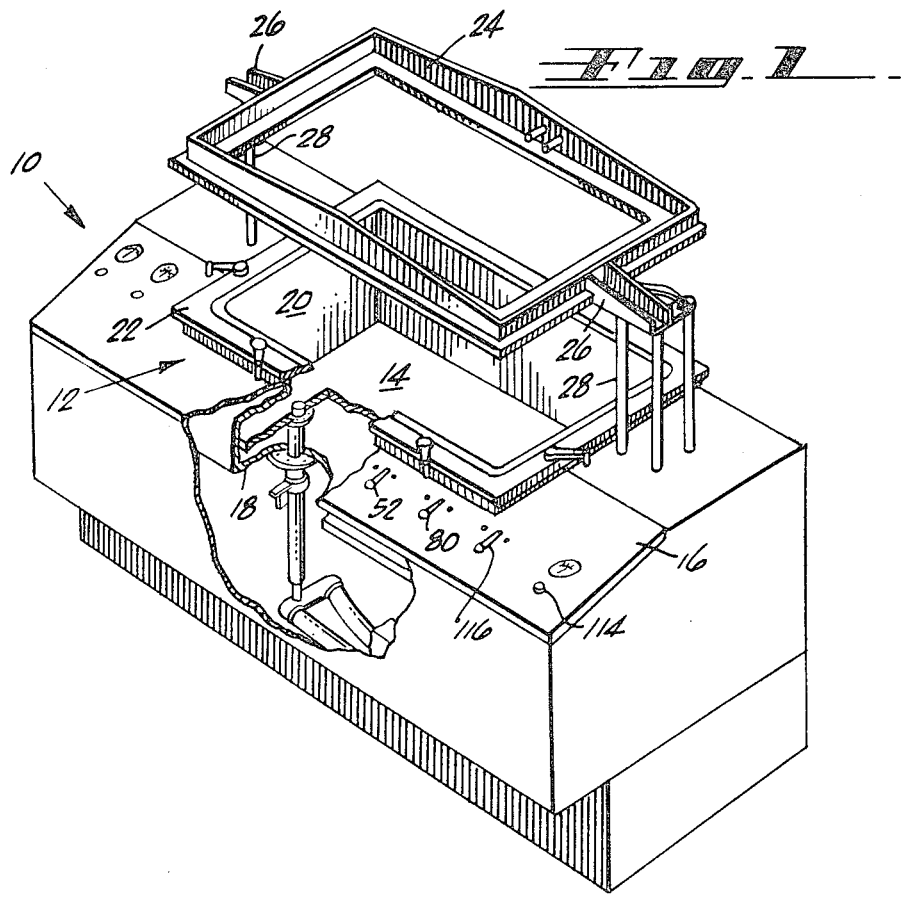
FIG. 1 is a perspective view of the apparatus with parts broken away to show some details.

The apparatus as seen in FIG. 1 generally comprises a support in the form of a cabinet 10 having a large rectangular opening in which is mounted chamber 12 containing platen 14. The cabinet encloses the various power and control components and is provided with a sloping forward surface 16 which serves as a console for the operator controls. The top of the cabinet is generally at waist height for convenient loading, unloading and control operation.

The chamber includes closed bottom and side walls 18 and 20 to form an airtight compartment for the vacuum forming operations, and a planar rectangular rim 22 defines the upper edge of the chamber. While the entire apparatus or the forming components thereof might be inclined to some extent, it has been found most satisfactory to arrange them vertically with rim 22 lying in a horizontal plane. A first draw ring, to be described later, is mounted on rim 22 and a second draw ring is mounted on rectangular frame 24. The latter is provided with brackets 26 at its ends which are secured to piston rods 28 vertically slidably mounted in air cylinders 30, FIG. 3, to vertically reciprocate the frame for purposes to be described.

Figure 2:
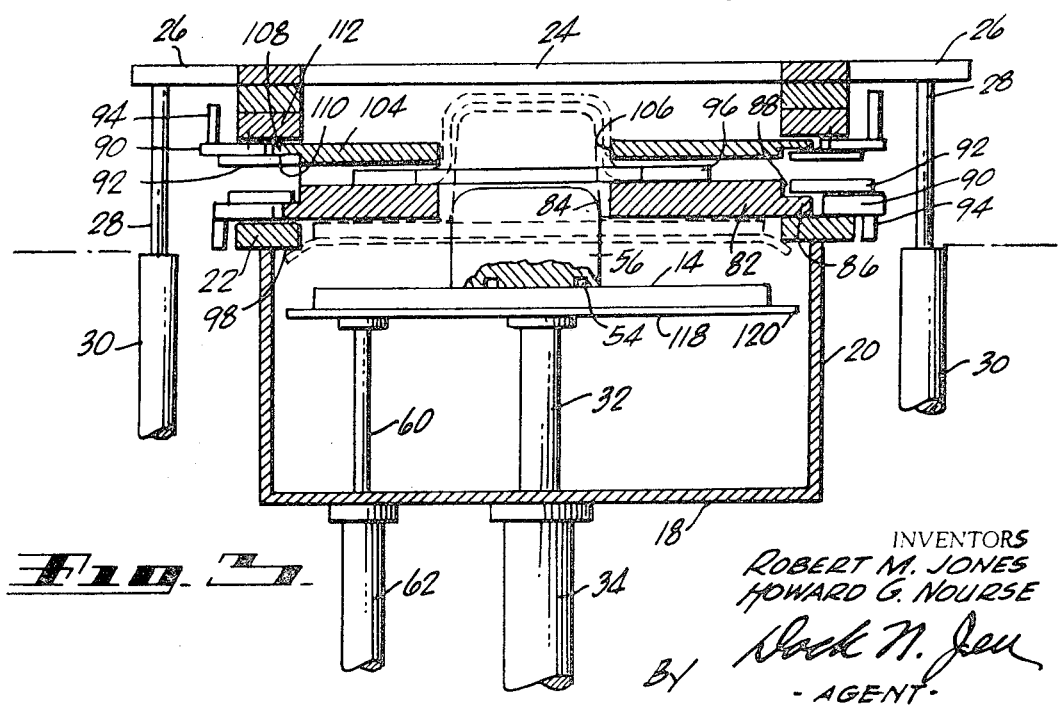
FIG. 2 is a perspective view of the chamber with portions omitted for clarity, the platen, form block, and some power components.
Figure 7:
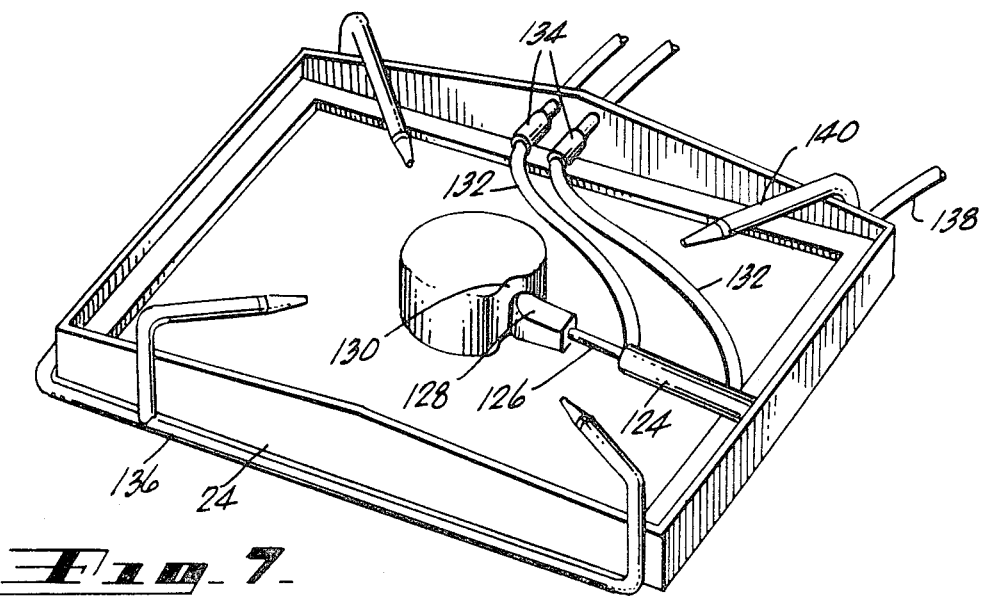
FIG. 7 is a perspective view of the upper draw ring with cooling and forming aid components.

As may be seen in FIG. 2, platen 14 is a flat plate arranged parallel to bottom wall 18 and is mounted for vertical movement on a piston rod 32 which passes through bottom wall 18 and is slidable in hydraulic cylinder 34. The latter is supplied in conventional manner with pressurized fluid from reservoir 36 through pump 38, conduits 40, 42, 44, 46, and valve 48 controlled by rod 50. Suitable connections extend from control lever 52 on the console to rod 50 to raise the platen to any desired level and hold it. Locating pins 54, seen in FIG. 3, extend from the upper surface of the platen and serve to locate and retain a suitable form block 56 in predetermined position on the platen.

An aperture 58 is formed through platen 14 and communicates with the upper end of conduit 60 which is fixed to the underside of the platen. The lower end of conduit 60 is slidably and sealingly received in a second conduit 62 fixed to the underside of bottom wall 18 of the chamber. A header 64 at the lower end of conduit 62 communicates through conduits 66 and 68 with pressure and vacuum surge tanks 70 and 72 respectively, having pressure and vacuum pumps 74 and 76. A valve 78 in the header is operated to connect either of conduits 66 and 68 to conduit 62 or to close communication. Valve 78 may be connected in any suitable way to control lever 80 on the console. With this system it is possible to supply or withdraw air from chamber 12 slowly or as rapidly as desired.

FIGS. 3 and 4 illustrate various additional details which contribute to the proper operation of the apparatus. In FIG. 3 it will be seen that the lower or first draw ring consists of a flat plate 82 provided with an aperture 84 therethrough in vertical registry with form block 56 and shaped and sized to freely pass it during the forming operation. The outer margin 86 is undercut to provide a shoulder 88. A series of rotary cam clamps 90 are spaced around the periphery of rim 22 and rotatably secured thereto. Each has a cam 92 adapted to overlie shoulder 88 and a lever 94 adapted to swing it between locking and unlocking position. In order to form a completely closed compartment defined by bottom wall 18, side walls 20, rim 22, ring 82 and the thermoplastic work piece 96 it is necessary to provide a seal between the ring and the rim. Although the seal could be carried by the ring, it is preferable to carry it on the rim so that only one will be necessary for any number of draw rings. In FIG. 4 it will be seen that the inner flange 98 of rim 22 is provided with a recess 100 extending around the periphery to receive a sealing ring 102 which is contacted and compressed by the draw ring when the cams lock it in position.

The upper or second draw ring is a substantially identical flat plate 104 provided with an aperture 106 in registry with aperture 84 and the form block, and shaped and sized to pass the form block when the block is covered by an overlying portion of work piece 96. Its margin 108 is provided with a shoulder 110 to receive cam portions 92 to lock it to member 112 of frame 24. When frame 24 is lowered, ring 104 is brought in proximity to ring 82 to grip the thermoplastic sheet work piece 96 between them. The air pressure in cylinder 30 can be adjusted by control 114 on console 16 to a value which will provide a slidable gripping action on the work piece. Raising and lowering is accomplished by control lever 116.

In certain operations it is necessary to seal the very small volume between the platen and form block, rim 22, ring 82, and the work piece. In addition to the seal previously described, a further seal is required between the platen and the rim. While it may be carried by either member, it is preferred to secure a sheet of rubber or the like, 118, to the lower surface of platen 14 with a marginal portion 120 extending beyond the periphery of the platen which is spaced substantially from walls 20. When the platen reaches the broken line position shown in FIG. 3, marginal portion 120 will sealingly contact the flange portion 98 of rim 22.

The general operation of the apparatus can best be described with reference to FIG. 3. A work piece 96 in the form of a flat sheet of thermoplastic material is laid on a flat table top under a source of radiant heat, which may be gas or electric power. In a short while it is raised to a temperature at which it is soft or "limp". It is then transferred to the apparatus and laid on first ring 82 as a free sheet overlying aperture 84. The second ring 104 is now lowered into contact with the work piece and the air pressure is adjusted to a value, predetermined by experience and experiment, at which the yielding grip is slight enough to allow the sheet to slide toward the center under forming loads.

The platen is now moved up to the solid line position shown in FIG. 3 with the form block about to contact the work piece. If desired, the form block may be initially located in this position to support the work piece against sagging if its temperature is above the optimum point. Continued upward movement of the form block to the dotted line position causes the work piece to slide out of the space between the draw rings and drape itself about the form block. Since the margin of the sheet is not fixedly restrained the entire sheet is free to distort or flow laterally in all directions within its own plane, which allows it to conform properly to the contour of the form block. The yielding restraint is just sufficient to produce such lateral flow and prevent the formation of wrinkles.

When the platen and form block are in their uppermost positions there is a very small volume enclosure between the platen and form block, the lower or first ring, and the work piece. By proper movement of valve 78 this enclosure may be evacuated to pull the sheet tightly against the form block for very accurate shaping. In fact, by opening valve 78 suddenly the vacuum is instantaneous because of the relatively large volume of surge tank 72, and the material is snapped against the form block. Telescoping conduits 60 and 62 facilitate producing the vacuum in this small space. To insure air flow if the platen flatly contacts ring 82, the upper surface of the platen is provided with a checkerboard arrangement of interconnecting air channels or grooves 122, seen in FIG. 2.

Figures 5, 6:
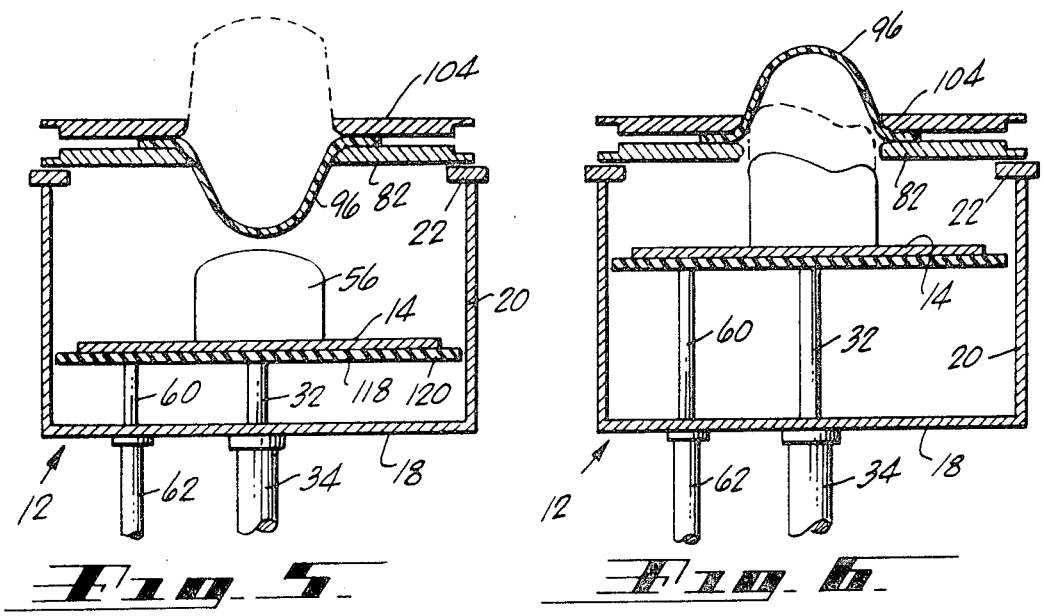
FIG. 5 is a view similar to FIG. 3 showing a vacuum assist technique.
FIG. 6 is a view similar to FIG. 5 showing another vacuum assist technique.

The same apparatus may be used in the manner illustrated in FIG. 5. Here the form block is initially located in a lower position. It will be noted that the marginal seal portion 120 does not contact walls 20 so that pressure or vacuum will be uniform throughout the chamber 12. Valve 78 is opened to tank 72 and the vacuum in the chamber will draw the work piece down into the bubble or dome form shown. If desired, the form block may be initially located to serve as a stop for the downward extension of the dome. This initial shaping allows the material to flow freely and adjust itself to an area approximately that of the form block to produce uniform thickness and lack of wrinkles in the finished part. The vacuum is now released and the form block moved upward to the dotted line position, the sheet draping itself smoothly over the entire contour.

The operation shown in FIG. 6 is quite similar but here the valve 78 is initially opened to tank 70 and the dome is blown upward. Thereafter, the form block moves up to its limit position to complete the part, with the air pressure gradually being reduced. If desired, the final step may be sudden opening of the vacuum line to cause the work piece to snap back on the form block for perfect shaping.

In some cases the form block may have a reverse bend or depression in a side surface. The vacuum snap back works quite well in most such cases but it is desirable to apply positive mechanical force if possible. For this purpose a small air-operated servo motor 124 may be mounted above the second ring and secured to either the ring or the frame. Its piston rod 126 carries a forming-aid body 128 at its free end and is adapted to push it into the depression 130 in the side of the work piece so that it will bottom properly in the corresponding depression in the form block. Conduits 132 connect with air supply fittings 134 permanently mounted on the frame.

Both draw rings and the form block are preferably made of non-metallic material of low heat conductivity to minimize their cooling effect on the heated work piece during the forming operation. This also reduces their heating effect during the period while the work piece is cooling back to a temperature where it takes a permanent set. To reduce the delay to a minimum, a conduit 136 is secured to the frame and connected to a cooling air supply line 138. Nozzles 140 are connected to conduit 136 at the corners of the frame and direct cooling air onto all exposed parts of the work piece. This greatly reduces the cycle time of the apparatus.

The apparatus described above is very inexpensive to build and economical and convenient to operate. The cycle time is much faster than prior devices used for the same purpose. All of the draw rings have the same outside form and dimensions, the only variation being the shape and size of the forming apertures. The quick release cam locks make re-tooling a matter of minutes, and the non-metallic draw rings are relatively light and easy to handle. The power and control devices have been shown in simple diagrammatic form for clarity of explanation. The control may be entirely manual or as automatic as desired.

It will be apparent to those skilled in the art that various changes may be made in the construction as disclosed without departing from the spirit of the invention, and it is intended that all such changes shall be embraced within the scope of the following claims.

We claim:

1. A method of forming a sheet of thermoplastic material into an article having a desired final shape, which comprises the steps of:
provinding a movable form block having a shape conforming to the desired final shape of the article and having a predetermined planform in a plane normal to its axis of movement;
establishing a forming zone;
placing a heat-softened flat sheet of thermoplastic material in said forming zone in a plane normal to the axis of movement of the form block;
slidably gripping the entire marginal portions of said sheet along a periphery closely conforming to and in registry with the planform of the form block;
initially applying a differential air pressure to the central portion of said sheet to slidably force it out of the gripping plane and cause local flow in various directions within the plane of said sheet to form it into a dome shape away from the form block prior to forming contact by it;
moving the form block along its axis of movement through the forming zone into contact with said sheet;
slidably forcing said sheet with the form block further out of the gripping plane and causing further local flow in various directions within the plane of said sheet to cause it to conform to the contour of the form block;
producing a completely airtight enclosure in conjunction with said sheet arranged over said periphery and on the side of the form block when it is at its extreme axial position of movement in forming said sheet;
gradually reducing said air pressure as the form block is moved along its axis of movement to its extreme axial position to produce said enclosure;
evacuating said enclosure to produce a vacuum condition which draws said sheet tightly against the form block for very accurate shaping;
maintaining said sheet in heat-softened condition throughout the forming operation;
cooling said sheet while it is held in its final form until it takes a substantially permanent set; and
retracting the form block along its axis of movement.

2. A method as defined in claim 1 wherein following the step of gradually reducing said air pressure, said enclosure is very rapidly evacuated to produce a vacuum condition which causes said sheet to snap towards the form block into conformity with the contour thereof.

* * * * *